United States Patent [19]

van Elten et al.

[11] 4,015,519
[45] Apr. 5, 1977

[54] APPARATUS FOR STORING CHEESE LOAVES AND FOR PERIODICALLY TURNING THEM UPSIDE DOWN

[75] Inventors: Gerrit Jan van Elten, Barneveld; Antonius Hurkmans, Baarn, both of Netherlands

[73] Assignee: Technisch Ontwikkelingsbureau van Elten B.V., Voorthuizen, Netherlands

[22] Filed: Apr. 24, 1975

[21] Appl. No.: 571,088

[30] Foreign Application Priority Data

May 3, 1974 Germany .......................... 2421515

[52] U.S. Cl. .................................. 99/452; 99/644
[51] Int. Cl.² .................................. A01J 25/16
[58] Field of Search .............. 99/652, 644; 214/1 Q

[56] References Cited
UNITED STATES PATENTS

| 2,366,615 | 1/1945 | Hansen | 99/461 |
| 2,567,957 | 9/1951 | Miollis | 99/644 |
| 2,702,943 | 3/1955 | Persson | 99/644 |
| 3,192,626 | 7/1965 | Le Boeuf | 99/644 |
| 3,730,326 | 5/1973 | Irving | 214/1 Q |

Primary Examiner—Harry N. Haroian

[57] ABSTRACT

A horizontal supply conveyor carrying a board with a number of loaves of cheese thereon is mounted for vertical adjustment in front of the open ends of a multiplicity of horizontal guideways disposed in superimposed and in juxtaposed relationship. By selective adjustment and selective operation of the conveyor the board is moved into registry with a selected one of said guideways whereupon a pushing device pushes the board from the conveyor and into the guideway in which similar loaded boards are stored the last one of which is thus discharged from the rear of the selected guideway onto another conveyor to be moved back to the first conveyor by transporting means which include a device for turning over the loaf.

12 Claims, 8 Drawing Figures

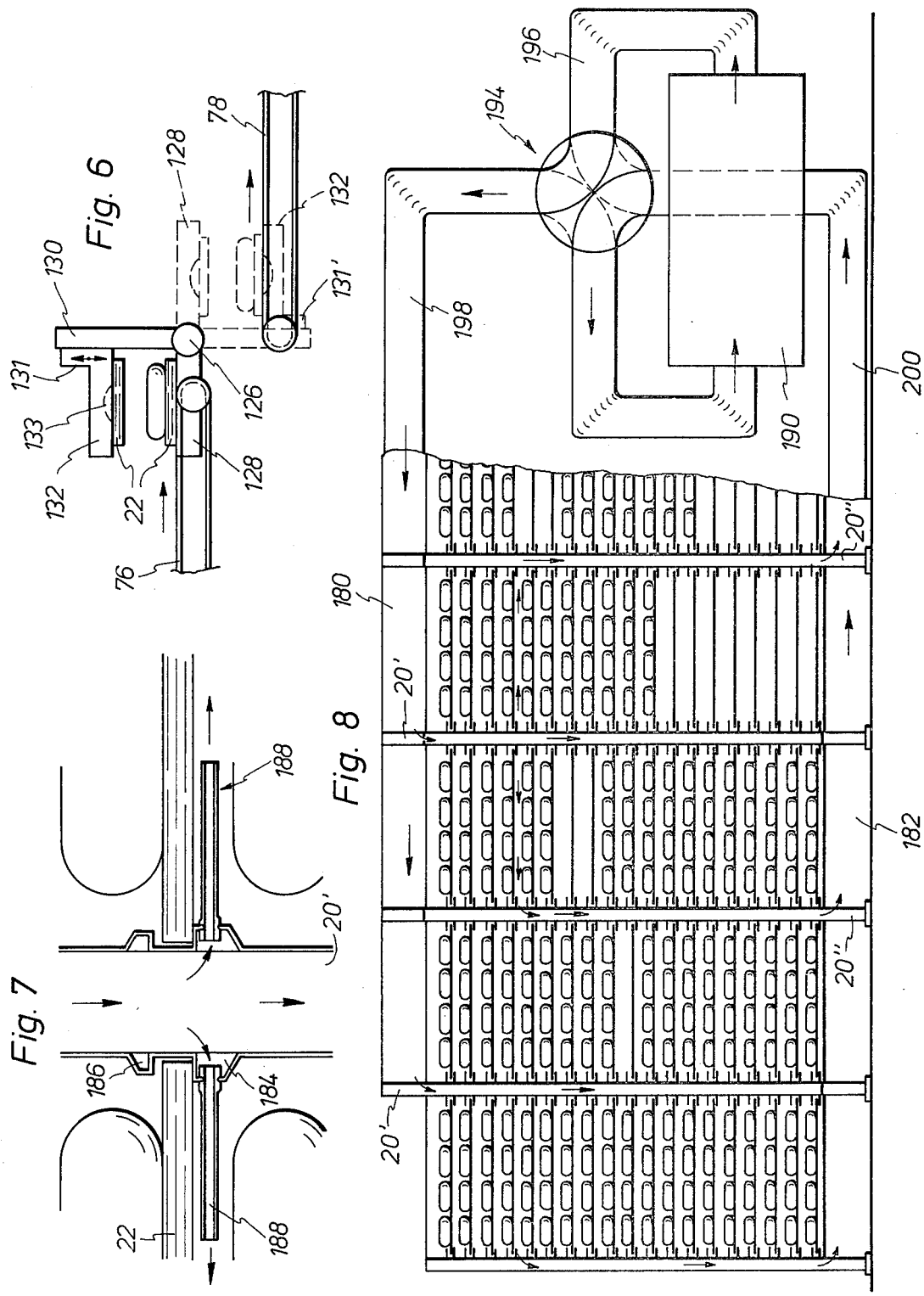

APPARATUS FOR STORING CHEESE LOAVES AND FOR PERIODICALLY TURNING THEM UPSIDE DOWN

BACKGROUND AND BRIEF DESCRIPTION OF INVENTION

Certain kinds of cheese are moulded to form loaves which are subjected to a careful conditioning method comprising storage in a carefully controlled environment and a repeated reversal of position by turning the loaves upside down.

It is the object of our invention to provide improved means for the performance of this treatment and, more particularly, to provide an apparatus capable of storing cheese loaves and of periodically turning them upside down within a very limited space, such apparatus being simple and reliable in operation and requiring a minimum of floor space for a high capacity.

We attain these objects by the provision of an array of adjacent units, each unit constituting a multiplicity of horizontal open-ended guideways in superimposed and juxtaposed relationship. Each guideway accommodates a multiplicity of adjacent horizontal boards which support the loaf or loaves of cheese. A horizontal supply conveyor extends transversely to said guideways in front of their open ends for conveying a loaf-carrying board into registry with a selected one of the guideways. After the board has reached its selected position, a pushing device mounted in adjacent relationship to the conveyor pushes the board therefrom and into the selected guideway. As a result, this board will push the entire row of horizontal boards in the selected guideway one step whereby the last one of the boards is discharged from the rear end of the guideway and is received by a horizontal discharge conveyor and conveyed to transporting means which move the board through an overturning station back to the supply conveyor whereby the loaf of cheese turned upside down is returned to storage in the same or in another selected guideway.

These and other features and advantages of our invention will become apparent in the more detailed description of preferred embodiments of our invention which follow hereinafter. In this description reference will be made to the accompanying drawings as briefly described below.

BRIEF DESCRIPTION OF DRAWINGS

FIG. 6 is an elevation of overturning means for turning cheese loaves upside down.

FIG. 7 is a partial view of a modified array of adjacent units provided with means for air circulation.

FIG. 8 is an elevation of a plurality of units of the embodiment shown in FIG. 7 provided with air circulating means.

Figure 1:
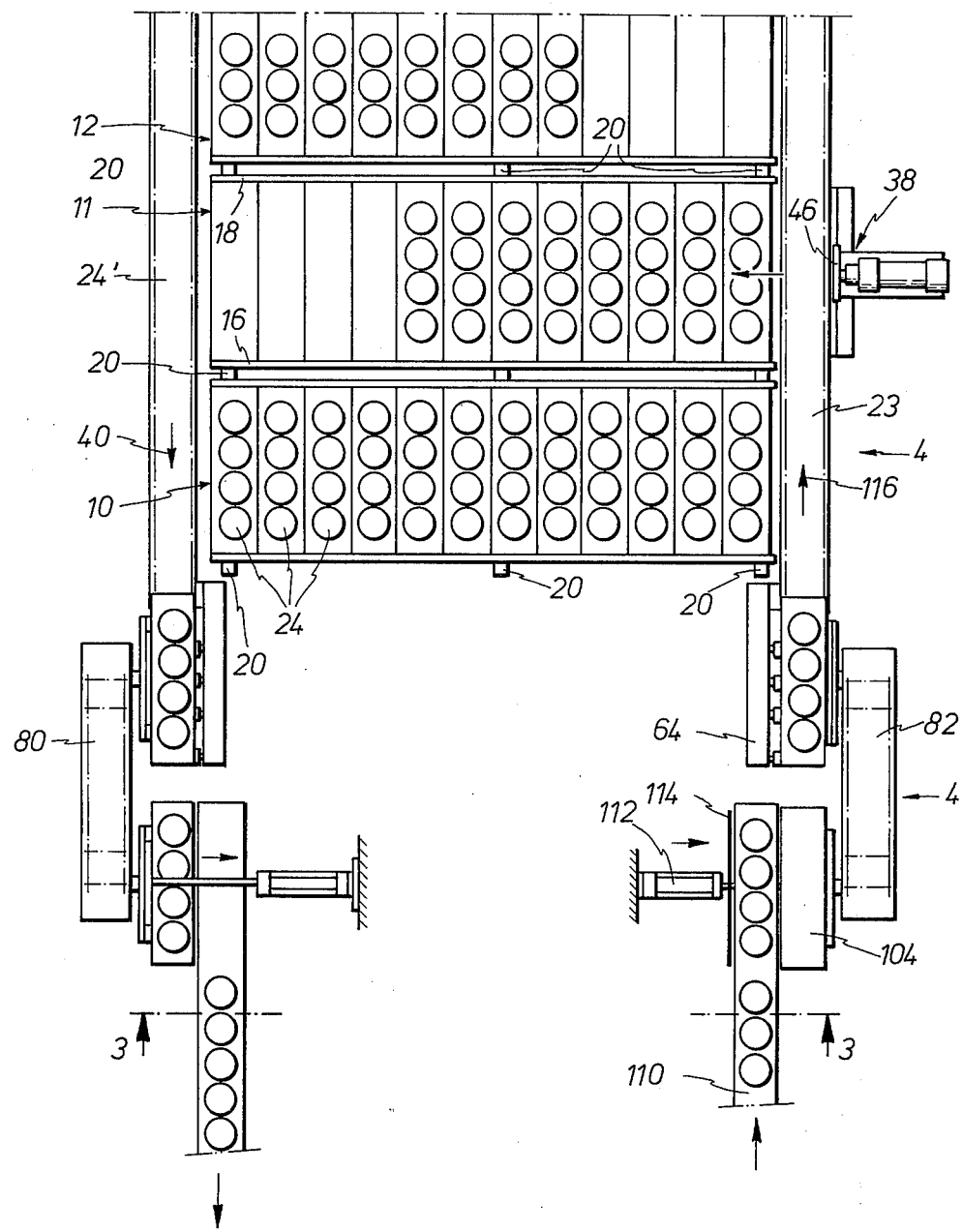
FIG. 1 is a plan view of an apparatus for storing cheese loaves and periodically turning them upside down, the top wall of the array of guideways being omitted so as to render the cheese loaves visible that are stored in the topmost guideways, some of the adjacent storing units, the horizontal conveyor system and the overturning means being omitted.
Figure 2:
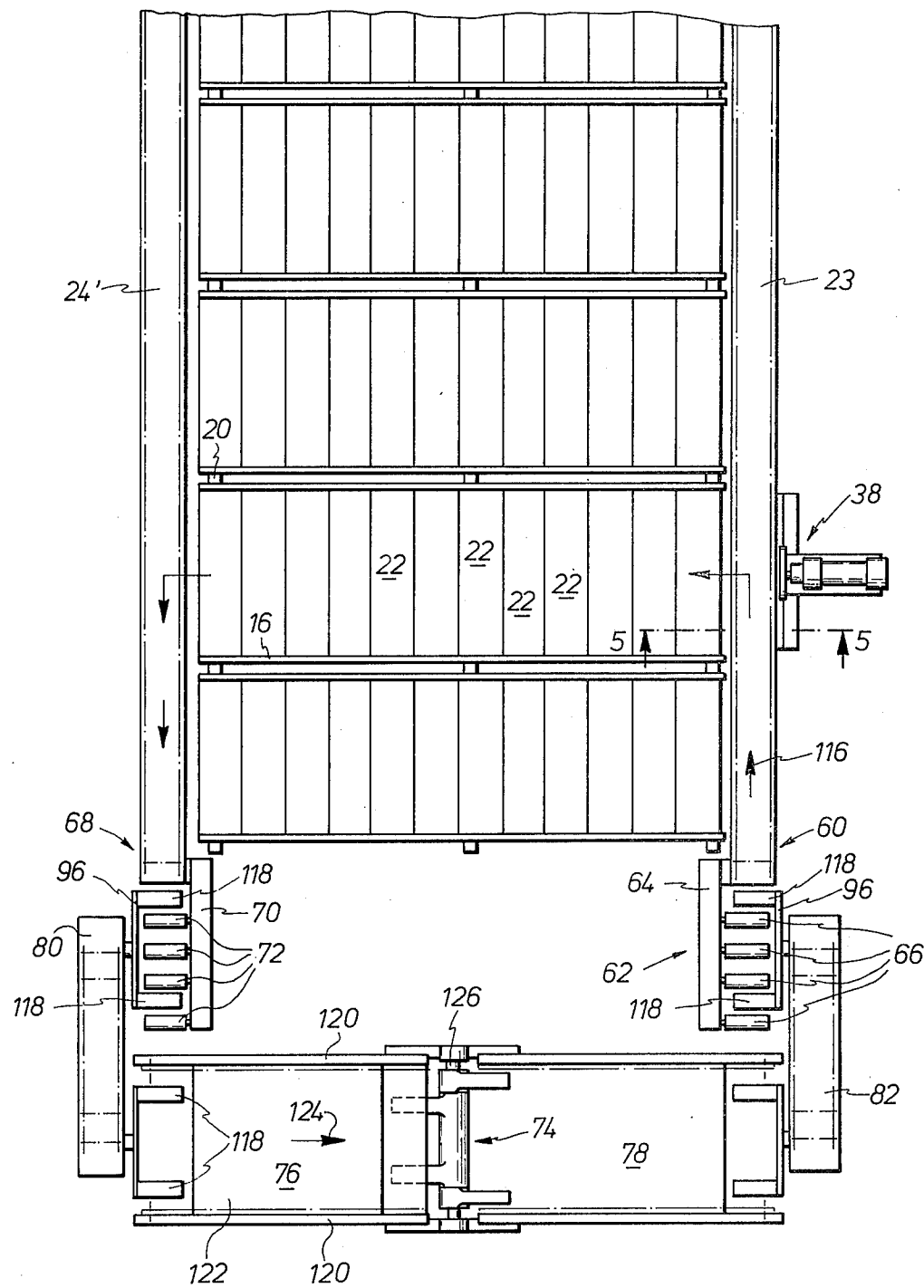
FIG. 2 is a view which is similar to FIG. 1 but illustrating the overturning means and the horizontal conveyor system extending thereto and therefrom.
Figure 4:
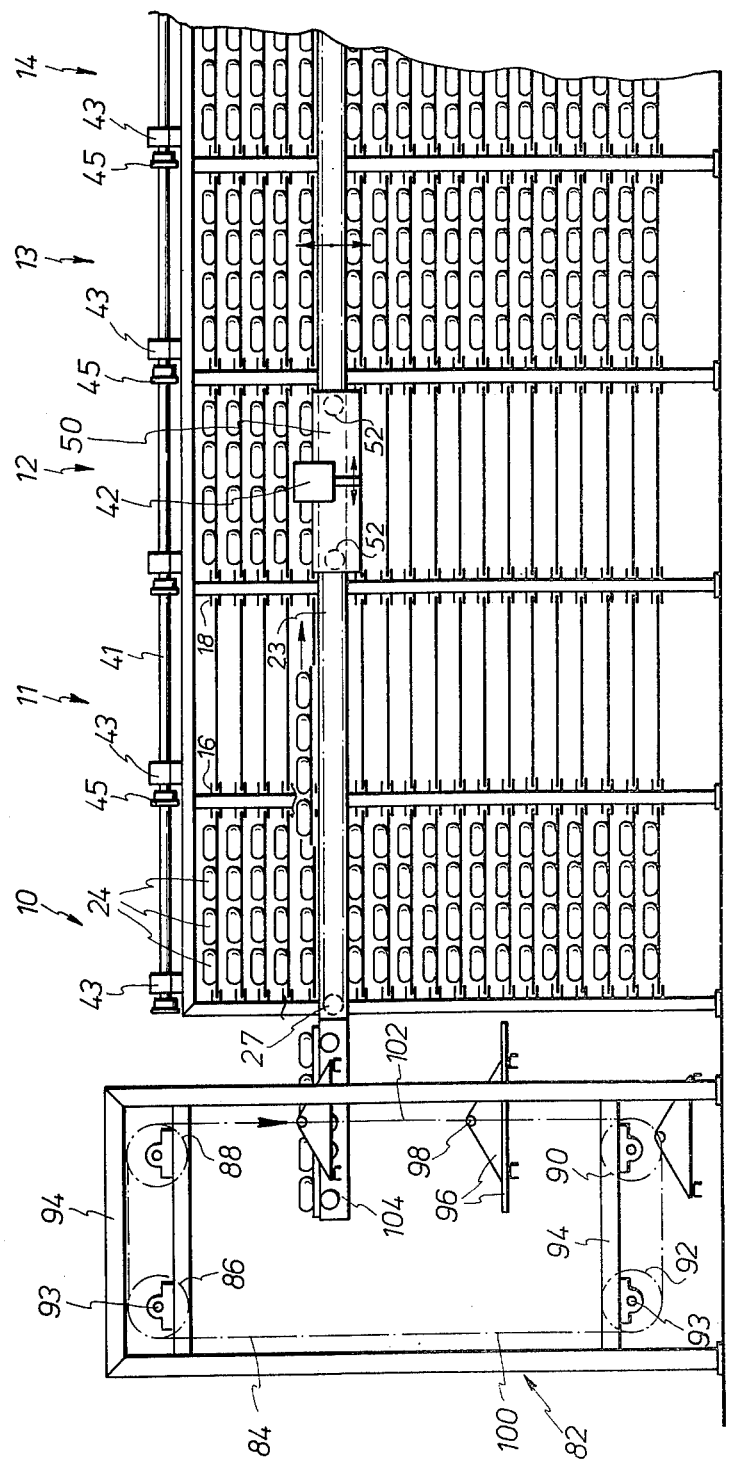
FIG. 4 is an elevation of our apparatus viewed in the direction of the arrows 4 in FIG. 1, the overturning means and the conveyor system extending thereto and therefrom being omitted.

Our apparatus for storing cheese loaves and for periodically turning them upside down comprises an array of adjacent units of any desired number. For the purpose of limiting the size of the illustrations units 10, 11, 12, 13 and part of unit 14 only are shown in FIGS. 2 and 4 and units 10, 11 and part of unit 12 only are shown in FIG. 1. The total numbers of units, however, of the embodiment described may amount to 12. Each unit constitutes a multiplicity of horizontal openended guideways in superimposed relationship, each guideway being formed by a pair of opposite parallel horizontal U-profiled bars, such as bars 16, 18 forming the topmost guideway of unit 11 in FIG. 4, each bar comprising a web portion welded or otherwise fixed to a row of vertical posts 20 and spaced horizontal arms extending from the web towards the interior of the unit. Each pair of opposite U-profiled bars 16, 18 embraces and guides the ends of elongate horizontal boards 22 extending transversely to the guiding bars 16, 20 and contacting each other. Each board carries a number of cheese loaves 24, FIG. 1. In the instant case each board 22 accommodates four of such loaves.

The vertical posts 20 are firmly fixed to a base or foundation. The number of superimposed guideways in each unit amounts to 19 in the instant case and the number of boards in each guidway amounts to 12 as shown in FIG. 2. The height of each guideway is in excess of the height of each loaf. As each board accommodates four loaves, 48 loaves of cheese of cheese may be stored in each guideway and 912 loaves of cheese in each unit. Therefore, where the apparatus comprises 12 units, it may store 10,944 loaves of cheese on a limited floor space. For the purpose of introducing and discharging the loaves into and from the array of adjacent units, horizontal conveyor means 23 and 24' extend transversely to the guideways 16, 18 in front and in the rear of the array of units. In the instant case each of these conveyor means is an endless feed belt trained around a pair of rollers carried by a horizontal beam 26, one of such rollers being shown at 27 in FIG. 4. Hence, the beam 26 constitutes a support for the conveyor 23. A similar beam not shown supports the discharge conveyor 24. Vertical guiding means formed by a plurality of rails 28 are fixed to the posts 20 in parallel relationship thereto. The beam or support 26 has a number of upwardly extending arms 30, each arm carrying an upper bracket 32 and a lower bracket 34, each bracket carrying parallel horizontal pins on which wheels 36 are mounted in such a way that each arm 30 constitutes a carriage running on the rails 28. Therefore, these rails 28 constitute vertical guiding means on some of the units 10–14 whereby the support 26 may be selectively moved up and down to thereby select anyone of the horizontal rows of guideways for the introduction of a loaves-carrying board 22' which has been placed on the horizontal supply conveyor 23.

The means for vertically adjusting the support 26 of the conveyor 23 further comprise a horizontal shaft 41 journalled in bearings 43 and carrying cable drums 45 fixed thereto, the bearings 43 being mounted on a top cover plate covering the array of adjacent units 10–14.

Figure 5:
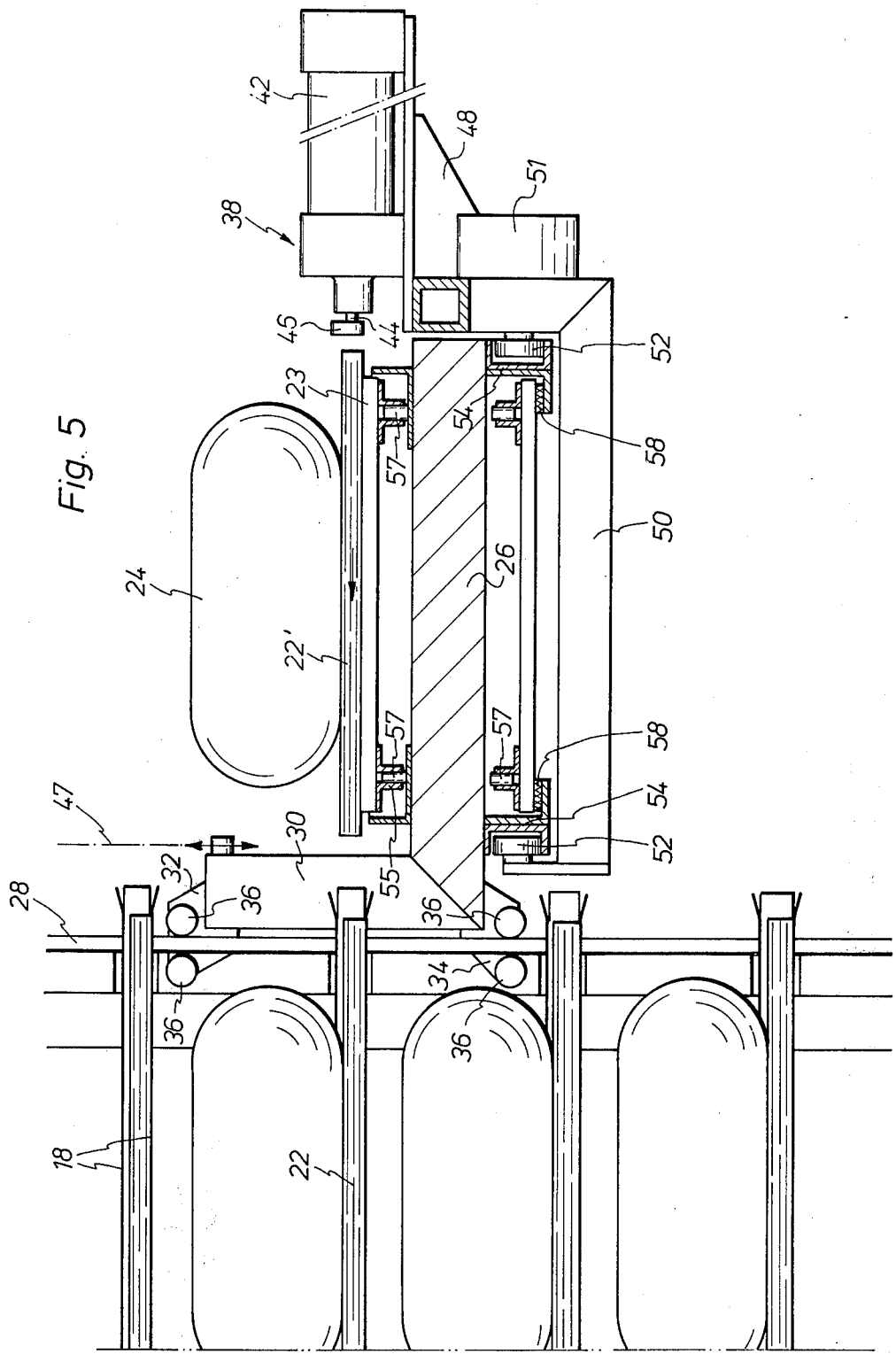
FIG. 5 is the section taken along the line 5—5 of FIG. 2 drawn on an enlarged scale.

Cables 47, FIG. 5, have their lower ends fixed to the arms 30 of support 26 and their upper ends fixed to the cable drums 45 to be wound up thereby. A similar series of cable drums connected with the supporting beam of the discharge conveyor 24' is mounted on a second common shaft on top of the cover plate for vertical adjustment of the discharge conveyor but is not shown in the drawings. Both shafts are geared to each other and are driven by suitable driving means to lift or lower conveyors 23 and 24' equal distances so as to adjust the two conveyors to a common selected level.

For the purpose of selecting this level, one of the rails 28, FIG. 5, carries 19 end switches, one for each of the nineteen guideways opening near the rail 28 as shown in FIG. 5. A selector switch is provided for selecting anyone of these nineteen end switches for operation. When the arm 30 associated with the switch-carrying rail 28 passes the switches, it will open them temporarily. The opening of anyone of the normally closed end switches will be ineffective, however, unless the switch opened temporarily has been selected by the selector switch. These end switches and the selector switch are not shown in the drawings. Quotation of the selector switch to another position will temporarily short-circuit all of the end switches and start the motor. It will be stopped again when arm 30 reaches and opens the newly selected end switch which by this time will be circuited no longer.

A pushing device 38 is mounted in adjacent relationship to the supply conveyor 23 for horizontally pushing the board 22' transversely from the conveyor 23 and into the selected guideway. For this purpose the carriages formed by the arms 30 of the support 26 have been adjusted to such a level that the board 22' will enter the guideway and abut the board 22 therein, as shown in FIG. 5 pushing the board 22 and all of the boards in contact therewith to the left with reference to FIGS. 1, 2 and 5. As a result, the leftmost board 22 loaded with cheese loaves will be pushed out of the rear open end of the guideway end onto the discharge conveyor 24' to be carried away thereby in the direction of the arrow 40 in FIG. 1.

The length of the stroke of the pushing device 38 amounts to the width of the boards 22 or 22' plus the distance between the boards 22 and 22' as shown in FIG. 5. Therefore, board 22' when fully pushed into the guideway will assume the same position which prior to the pushing operation was occupied by board 22 shown in FIG. 5.

The pushing device 38 comprises a housing 42, a horizontal push rod 44 guided therein, a head 46 on the outer end of the push rod and the same level as board 22', and suitable power-driven means for reciprocating push rod 44 horizontally. Such power-driven means may be a solenoid or a hydraulic or pneumatic unit composed of cylinder and piston or any equivalent means that are well known in the art and, therefore, need not be described in detail. The housing 42 is mounted on a bracket 48 fixed to a carriage 50 having wheels 52 running on a track formed by a pair of parallel horizontal U-shaped beams 54 fixed to the bottom of support 26. A motor 51 is mounted on the carriage 50 and geared to one or more of the wheels 52 to thereby drive the carriage 50 into registry with anyone of the twelve units, such as 10–14. For the purpose of selecting anyone of the units for cooperation with the pushing device 42, the support beam 26 is equipped with 12 end switches one for each unit which are normally closed but will be opened by the carriage 50 when the same arrives into registry with the respective unit. A second rotary selector switch adjustable by the operator to anyone of 12 positions is so connected with the end switches of beam 26 as to select anyone of them for operation. When the operator resets the selector switch to another position, the motor driving carriage 50 will be started and at the same time all of the end switches of beam 26 will be closed temporarily. When carriage 50 arrives at the selected position and opens the end switch coordinated thereto, the motor will be stopped.

Moreover, suitable control means are provided for stopping the supply conveyor 23 immediately upon arrival of a board thereon such as board 22' arrives in the cooperative position with respect to the carriage 50 and the pushing device carried thereby. For this purpose, an end switch (not shown) is mounted on carriage 50 for actuation by board 22'. Such actuation will immediately arrest the motor driving the conveyor 23.

Each of the conveyors 23, 23' formed by an endless chain composed of a row of plates connected by pivotal links 57. The links 57 of the upper stretch of the endless chain slide on rails 55 fixed to the beam 26, whereas the lower stretch thereof is supported by pads 58 mounted on the beams 54 fixed to support 26.

The input end 60, FIG. 2, of the supply conveyor 23 which extends around the roller 27 shown in FIG. 4, is equipped with a receiver 62 on which the board 22' was deposited for transfer to the conveyor 23 and for transport to the position shown in FIG. 5, see FIG. 2. This receiver 62 comprises a horizontal bar 64 extending parallel to the conveyor 23 but laterally offset therefrom and fixed to the end of the supporting beam 26. The bar 64 carries a number of horizontal pins on which parallel horizontal rollers 66 are mounted for rotation. These rollers are so located in spaced relationship as to be tangent to the bottom side of a plane coinciding with the top surface of conveyor 23. They are continuously driven by motor means which may be installed inside of the rollers or in cavities of bar 64. Therefore, a board placed on top of the rollers 26 will be fed thereby to the conveyor 23 and carried alont by the same to the position selected by the second rotary selector switch.

One of the end rollers of each conveyor, such as the end roller 28 is coupled to the electrical motor which, as described hereinabove, is controlled by the end switches of support beam 26 and by the second rotary selector switch settable by the operator to anyone of the 12 units. This motor may be mounted on the support beam 26. It is not illustrated in the drawings.

The board discharged from the guideway selected by the setting of the two rotary selector switches will be fed by the discharge conveyor 24' to the output end 68 thereof, FIG. 2, and on a receiver 70 which is similar to receiver 64 but differs therefrom by the absence of any driving means for the rollers 72.

Figure 3:
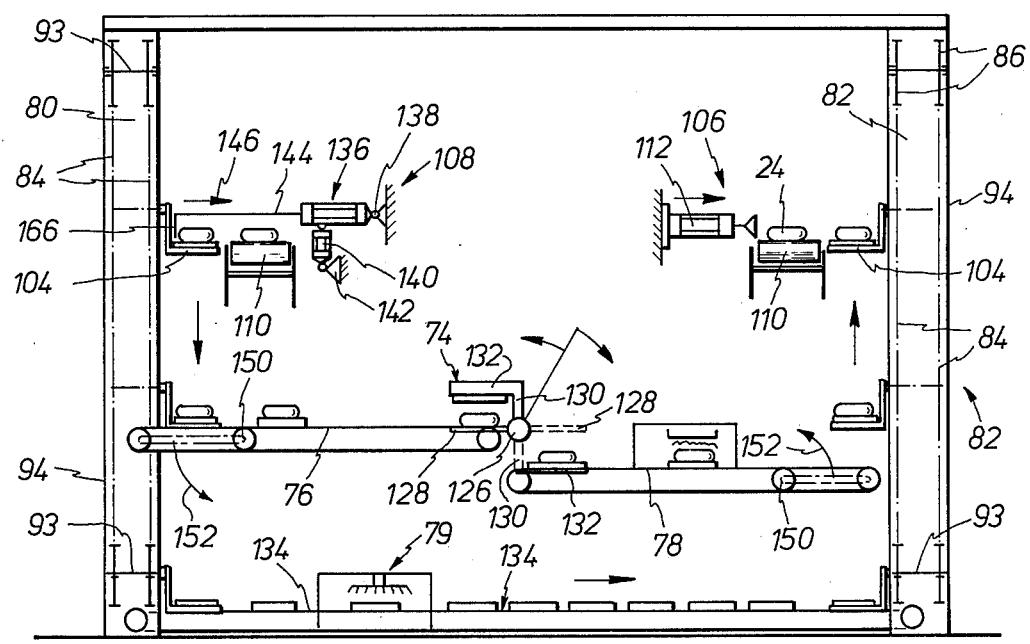
FIG. 3 is a sectional end view of the apparatus shown in FIGS. 1 and 2, the section being taken along the line 3—3 of FIG. 1, the pushing device being omitted.

Adjacent to unit 10 at the left thereof as viewed in FIG. 4 transporting means extend from the output end 68 to the input end 60, FIG. 2, and overturning means 74 for turning the loaves upside down are included in such transporting means. These transporting means comprises a horizontal conveyor system 76, 78, FIG. 2 and 3, extending to and from the overturning means 74 and mounted at a fixed level. A first elevator 80 of the paternoster type connects the output end 68 of the discharge conveyor 24' with a first conveyor 76 forming part of the conveyor system. A second elevator 82 of the paternoster type connects a second conveyor 78 forming part of the conveyor system with the input end 60 of the supply conveyor 23. Each of the elevators 80 and 82 comprises a pair of endless chains 84, FIG. 3 and 4, pairs of sprockets 86, 88, 90, 92 mounted for rotation about stationary horizontal axes 93 in a supporting frame 94, and holders, such as 96, mounted on each pair of chains 84 for pivotal motion about a horizontal axis 98. The endless path on which each chain 84 is guided includes vertical sections 100 and 102. These sections are located within a vertical plane which coincides with the associated horizontal conveyor such as 23 in FIG. 2. Each holder 96 carries a horizontal tray 104 which is so dimensioned as to accommodate a board 22. Suitable motor means (not shown) are provided for driving one of the axles 93 of elevator 82 in such direction that the trays 104 will be caused to descend along section 102 then moved to the left with reference to FIG. 4, then rise along section 100 and return to the right at the top of the elevator.

Within the space between the two elevators 80 and 82 a supply station 106 and a discharge station 108 are located, each of these stations comprising a horizontal endless conveyor belt 110 adapted to convey a series of cheese loaves 44 and a pushing device, such as 112 which is similar to the pushing device 38 described hereinabove, the head 114 having a length sufficient to push a row of four loaves from the conveyor 110 and onto a board 22 previously placed on the tray 104 manually or by suitable automatic means to be described hereinafter. The motor means driving one or more of the axles 93 of elevator 82 are so controlled as to be at rest during operation of the pushing device 112.

The vertical section 102 of chain 84 is located in substantial registry with the pushing device 112 as will appear from FIG. 1.

The motor of elevator 82 is then started causing the tray 104 now carrying a board loaded with four loaves to be lifted, to be moved in the direction of arrow 116 in FIG. 1 above the receiver 62 and then to be lowered. The tray 104 comprises a pair of fingers 118, FIG. 2, which in the course of the descend of the tray pass through the gaps between the rollers 66 and the conveyor 23 whereby the loaded board 22 on the tray will be deposited on the driven rollers 66 and will be transferred by the same to the conveyor 23.

The elevator 80 need not be described in detail as it is similar to the elevator 82 except that the rising trays 118 thereof pass through the gaps between the fingers 72 and the discharge conveyor 24' to lift the discharged board and to pass it on to the conveyor 76. This conveyor comprises a pair of endless chains 120 each carried by a pair of sprockets. The upper stretches of the chains 120 extend horizontally parallel. The axles of the sprockets are mounted on a stationary supporting frame 122 which is so shaped as to permit passage of the downwardly moving trays 118 of elevator 80 through the space between the sprockets at the left end of conveyor 76, as viewed in FIG. 2. Therefore, a board 22 placed on the tray 118 descending between the chains 120 will deposit the board 22 on these chains for transportation in the direction of arrow 124 in FIG. 2. The loaded board travelling on conveyor 76 will enter the overturning means 74. These overturning means are diagrammatically illustrated in FIG. 3 but will be described hereinafter by reference to FIG. 6 which illustrates the details thereof.

A horizontal shaft 126 mounted in stationary bearings suitably fixed to the base of the apparatus carries a pair of parallel radial arms 128 and another pair of radial arms 130 extending at right angles to the arms 128. The arms 130 are provided with longitudinal guideways on which a slide 131 is slidably mounted. Means not shown are provided on arm 130 and connected with slide 131 for moving same between a first position in which the slide is close to shaft 126 and a remote position in which the slide is spaced a longer distance from shaft 126. The slide 131 carries a pair of arms 132 extending parallel to the arms 128. Each of the opposed faces of arms 128 and 132 are provided with ports 133 and with suitable valve means for connecting such ports with or disconnecting them from a source of vacuum.

Moreover, actuating means are provided for turning shaft 126 through an angle of 180° from the position shown in FIG. 6 in full lines to the position shown in FIG. 6 by dotted lines in clockwise direction and back in anticlockwise direction.

When the loaded board is fed by conveyor 76 into engagement with the overturning means, the board 22 carrying the loaves of cheese enters the space between the arms 128 and the arms 132. An empty board 22 is carried by the arms 132 and held in contact with the bottom faces thereof by suction applied by the valve mechanism referred to hereinabove.

When the loaded board 22 has reached the position shown in FIG. 6, the actuating means coordinated to the slide 131 are so controlled as to move this slide and its arms 132 downwardly until the empty board 22 contacts the loaf and presses it and its supporting board against the arms 128. When that has been accomplished, the driving means of shaft 126 are put in operation turning this shaft in clockwise direction through 180°. Thereafter the slide 131 is moved in a direction away from the arms 128 into the position 131' thus placing the arms 132 below the top level of conveyor 78 thus depositing the overturned loaves of cheese on the board held by suction in contact with the arms 132. Thereafter, the valve mechanism referred to hereinabove disconnects the source of vacuum from the suction ports of the arms 132 thus releasing the loaded board for transportation by the conveyor 78. The suction ports of the arms 128, however, remain in communication with the source of vacuum thus holding the board in contact with the arms 128. When the loaves leaving the turnover mechanism have left the arms 132, the shaft 126 is actuated and turned in anticlockwise direction through 180°. During this turn the slide 131 is moved again towards the shaft 126 until the arms 132 contact the boards held by suction on the arms 128. When this contact has been achieved, the source of vacuum is disconnected from arms 128 and is connected to arms 132 thereby causing these arms to take over the board. Upon completed return of shaft 126 the arms 128 and 132 are moved back into the position shown in FIG. 6 with arms 132 holding an empty board in readiness for the receipt of the next set of loaves. A horizontal conveyor formed by an endless belt 134 moves boards deposited on the left end of this conveyor through the cleaning station 79 and to the bottom end of conveyor 82 where the boards are picked up by the ascending trays 104 thereof and will then be charged by the pushing device 112 with new loaves.

It was stated hereinabove that the discharge station 108 is similar to the supply station 106 and, therefore, need not be described in detail. It must be mentioned, however, that the pushing device 136 of the discharge station 108 differs from the pushing device 106. Its housing is mounted for pivotal motion about a horizontal axis 138 on a stationary bracket and is adapted to be swung up or down by an actuating mechanism 140 which is extensible and contractable and has its ends pivotally mounted to the housing of the pushing device 136 and to a stationary bracket 142. The push rod 144 of the pushing device 136 has a downwardly extended head 166. The actuating means included in housing 136 and the actuating mechanism 140 may be hydraulic means comprising piston and cylinder in a known manner. They are so controlled by suitable valve mechanism that, starting from the resting position not shown in FIG. 3, the actuating mechanism 140 is extended to swing the housing of the pushing device 136 upwardly and the push rod 144 is extended whereupon its housing is lowered by contraction of actuating mechanism 140 thus bringing the elements into the position shown in FIG. 3. Then rod 144 is retracted to thereby move the loaves from the board on the tray 104 of elevator 80 onto the conveyor 110. The emptied board, however, is left on the tray 104 and can be transported downwardly for deposition on the conveyor 134.

With this design it is within the discretion of the operator either to return any discharged group of loaves to the supply conveyor 23 or to transfer it to the discharge conveyor 110 in the discharge station 108.

In the absence of special modifications described hereinbelow, the conveyor system 76, 78 would interfere with the descend and ascend of the boards to and from the conveyor 134 by the elevators 80 and 82. Therefore, each of the conveyors 76 and 78 is modified by the subdivision of its supporting frame 122 into a pair of sections pivotally connected to each other by a horizontal hinge 150. Similarly, each chain 120 is replaced by a pair of chains extending around sprockets mounted on the pivot pin of the hinger 150, FIG. 3. Therefore, the lefthand end section of conveyor 76 and the righthand end section of conveyor 78, as viewed in FIG. 3, may be swung in the direction of arrows 152 into an inactive position out of the path of the trays 104 and 118. Suitable detents (not shown) are provided to keep the swingable portions of the conveyors 76 and 78 optionally in the active position or in the inactive position.

Suitable control means (not shown) are provided for controlling the elevators 80 and 84 and for controlling the conveyors 76 and 78 and the turnover means 74. The motor driving one of the shafts 93 of elevator 82 is normally at rest. It is started contemporaneously with the actuation of the pushing device 106 for a predetermined period of time sufficient to transport the board pushed by device 112 onto a tray 104 upwardly in the direction of arrow 110 and then downwardly and to deposit the board on the receiver 62. Thereupon elevator 82 is stopped. Moreover, the motor driving elevator 82 is started whenever a group of turned loaves arrives on conveyor 78 in proper position to be picked up elevator 82. For this purpose an end switch is provided which is closed by the board to be picked up.

The motor driving conveyor 80 is put in operation whenever a loaded board arrives on the discharge conveyor 24' its discharge end 68. For this purpose a suitable end switch is mounted on the supporting beams of conveyor 24'. Contemporaneously the end switch starts a timing circuit which will stop the motor operating the elevator 80 after a period of time sufficient to move a tray from its lowest position to its topmost position then horizontally and thereafter from the topmost position to its lowest position. However, additional means are provided which may stop elevator 80 at earlier times. Such additional means comprise a first end switch mounted on frame 94 of elevator 82 for actuation by a descending board upon arrival at the discharge station 108 and a second end switch likewise mounted on frame 94 for actuation by a loaded board arriving at the conveyor 76. A selector switch is provided enabling the operator to select the first end switch or the second end switch for operation depending on whether the discharged group of loaves is to be discharged at station 108 or is to be turned upside down and to be returned to the storing units.

The motor driving shaft 126 is started by an end switch responding by arrival of a loaded board on arm 128. It is stopped by another end switch after rotation through 180°.

For the purpose of controlling the environment of the loaves 44 suitable means may be provided for circulating conditioned air through the passageways confined by the boards 22 in the storing units 10–14.

An embodiment of our invention in which such provisions are made is illustrated in FIGS. 7 and 8. In this embodiment each row of posts 20 is replaced by a hollow wall 20' or 20'' respectively. The internal space of each hollow wall is sealed except for an opening. When the walls are numbered with reference to FIG. 8 from the left to the right, each odd wall is provided with this opening at its bottom and each even wall is provided with this opening at its top. Four of the openings located at the top of the apparatus communicate with a horizontal passageway 180. At the bottom of the apparatus a horizontal passageway 182 is provided which communicates with the bottom ports of the hollow walls.

Each horizontal guideway guiding the loaded boards through the apparatus is formed by hollow horizontal ribs 184, 186 formed by the side plates constituting the hollow walls. The ribs 184 supporting the loaded boards 22 have openings in which tubes 188 are inserted having open ends terminating in the interior of the units.

A fan 190 circulates a stream of air in one or another direction depending on the adjustment of a valve mechanism 194. When this valve mechanism is adjusted as shown in FIG. 8 the air fed by pump 140 flows through a duct 196 through the valve mechanism 194 to a duct 198 and thence to the passageway 180 and through the top openings into the hollow walls bearing even members and through the pipes 188 into the interior of the unit. The pipes communicating with the odd-numbered hollow walls conduct air from the interior of the units through such hollow walls into the passageway 182 and thence through a duct 200 through the valve mechanism 194 to the suction side of the fan 190. This circulation may be reversed by turning the valve mechanism 194 through 90°. The reversability of the air circulation permits to dry the loaves uniformly and under exact control.

The embodiments shown and described hereinabove are capable of numerous modifications within the scope of the appended claims. Thus the number of the units and the number and length of the passageways in each unit can be varied within wide limits. The pneumatic suction means provided in the turnover device of FIG. 6 can be replaced by suitable mechanical means. Moreover, the shaft 126 may beprovided with two sets of arms 128 pointing in opposite directions and with two sets of arms 130 pointing in opposite directions. With this modification the shaft 126 can be stepwise turned in one direction only by suitable indexing means. With this design the discharge of the cheese turned over and transmitted to conveyor 78 may occur simultaneously with the introduction of a set of loaves into the turnover mechanism by conveyor 76. Numerous other modifications are obvious to those skilled in the art within the scope of the appended claims.

What we claim is:

1. An apparatus for storing cheese loaves and for periodically turning them upside down, said apparatus comprising an array of adjacent units, each unit constituting a multiplicity of horizontal open-ended guideways in superimposed relationship, each guideway accommodating a multiplicity of adjacent horizontal boards, each board having a width and a length sufficient to support at least one loaf of cheese, the height of each guideway being in excess of the height of each loaf, horizontal supply conveyor means extending transversely to said guideways in front of said array for conveying a loaf-carrying board into registry with a selected one of said guideways, said supply conveyor means having an input end, a pushing device mounted in adjacent relationship to said supply conveyor means for horizontally pushing said board on said conveyor means away from the latter and into said selected guideway a distance corresponding to the width of said board causing the latter to push said multiplicity of adjacent horizontal boards one step thereby discharging one board from said selected one of said guideways on the rear side of said array, horizontal discharge conveyor means extending transversely to said guideways across said rear side of said array for receiving the discharged board from said selected one of said guideways, said discharge conveyor means having an output end, means for vertically adjusting said horizontal supply conveyor means and discharge conveyor means to a common selected level into registry with a selected horizontal row of said guideways, means for moving said pushing device into registry with said selected one of said guideways, transporting means extending adjacent to said array from said output end of said discharge conveyor means to said input end of said supply conveyor means, and overturning means for turning a cheese loaf upside down, said overturning means being included in said transporting means.

2. The apparatus claimed in claim 1 in which each of said horizontal boards has a length sufficient to support a single row of juxtaposed loaves of cheese and extends transversely to said guideway and parallel to said conveyor means.

3. The apparatus claimed in claim 1 further comprising a track coextensive with said horizontal supply conveyor means, a carriage running on said track and carrying said pushing device whereby said pushing device is movable by said carriage into registry with any selected one of said adjacent units.

4. The apparatus claimed in claim 3 in which said means for vertically adjusting said horizontal supply conveyor means and said horizontal discharge conveyor means to a common level comprises a support for each of said conveyor means, vertical guiding means on said units, said support being mounted on said guiding means for selective up and down motion and carrying one of said horizontal conveyor means amd said track, and lifting means connected to said support for lifting same to a selected level said lifting means being mounted on at least some of said units.

5. The apparatus claimed in claim 1 in which said transporting means extending adjacent to said array from said output end of said discharge conveyor means to said input end of said supply conveyor means comprises a horizontal conveyor system extending to and from said overturning means and mounted at a fixed level, a first elevator means connecting said output end of said discharge conveyor means with said conveyor system and second elevator means connecting said conveyor system with said input end of said horizontal supply conveyor means, whereby a board carrying at least one loaf of cheese and discharged from said selected one of said guideways at the rear of said array will be transported by said horizontal discharge conveyor means to said first elevator means and will be moved by the latter to another level and transferred to said transporting means and by the latter to said overturning means and therefrom to said second elevator means and will then be moved by the latter to the level of said input end or said horizontal supply conveyor means and transferred thereto and fed by the same to a selected one of said guideways to be pushed into the latter by said pushing device.

6. The apparatus claimed in claim 5 further comprising a cleaning station between said first elevator means and said second elevator means for cleaning said boards and auxiliary conveyor means for selectively feeding boards from said first conveyor means through said cleaning station to said second conveyor means.

7. The apparatus claimed in claim 5 further comprising a supply station and a discharge station located within the space between said elevators, each of the latter comprising at least one endless chain, sprockets mounted for rotation about stationary axes for guiding said chain along a path including vertical sections located within a vertical plane coinciding with one of said horizontal conveyors, holders each mounted on said chain for pivotal motion about a horizontal axis, each holder carrying a tray, and means for intermittently operating said sprockets, one of said vertical sections being located adjacent to one of said stations and the other one of said vertical sections being located adjacent to one of said ends of said conveyor means.

8. The apparatus as claimed in claim 1 in which the transporting means transporting the boards to and from the overturning means is including two separate conveyors arranged at different levels with the overturning means therebetween, the overturning means including a shaft rotatable into two positions and having radially attached thereto a first arm structure adapted to be moved into the plane of the conveyor leading to the overturning means for receiving a board with at least one loaf, the overturning means being provided also with a second arm structure mounted for movement to and from the first-mentioned arm structure so as to clamp and release a board and loaf between said first and second arm structures, with the second arm structure being adapted to be moved into the plane of the conveyor leading away from the overturning means for depositing thereon the board and loaf after the overturning operation.

9. The apparatus according to claim 8 wherein the overturning means is including a single pair constituted by first and second arm structures and mounted to a shaft rotatable back and forth by 180° between the first conveyor and the second conveyor of said transporting means.

10. The apparatus according to claim 8 wherein the overturning means is including two opposite pairs of arm structures mounted to a shaft rotatable for successive half revolutions in the same direction and at each half revolution transferring one of the opposite arm structures, respectively, radially attached to the shaft into the plane of the first conveyor of the transporting means.

11. The apparatus claimed in claim 1 with air circulation means is provided supplying and withdrawing air with respect to the individual units for controlled conditioning of the cheese within the apparatus, such air circulation means including a fan which through air ducting means is supplying air through one of the walls of each unit and withdrawing air from the other of the walls of each unit, respectively, the air ducting means including air outlet tubes and air suction tubes distributed all over the walls of the units.

12. The apparatus as claimed in claim 11 wherein valve means are provided for reversal of the direction of the air circulated by said fan.

* * * * *